United States Patent [19]

Lowry et al.

[11] Patent Number: 4,663,089
[45] Date of Patent: May 5, 1987

[54] DIFFUSED BUBBLE AERATION SYSTEM

[76] Inventors: Jerry D. Lowry; Sylvia B. Lowry, both of R.F.D. #2, Box 2400, Thorndike, Me. 04986

[21] Appl. No.: 826,748

[22] Filed: Feb. 6, 1986

[51] Int. Cl.$^4$ .............................................. B01F 3/04
[52] U.S. Cl. ................................ 261/23.1; 210/221.2; 210/750; 261/26; 261/122; 261/124
[58] Field of Search ................... 261/23 R, 26, 27, 93, 261/122, 124, 70, 120, 77; 422/170, 231; 209/170; 210/221.2, 219, 220, 750, 85, 739; 55/169, 256

[56] References Cited

U.S. PATENT DOCUMENTS

| | | | |
|---|---|---|---|
| 2,138,349 | 11/1938 | Mallory | 261/93 X |
| 2,664,341 | 12/1953 | Kesting | 422/170 X |
| 2,872,415 | 2/1959 | Schleyer et al. | 210/750 |
| 3,116,347 | 12/1963 | Allen | 261/26 |
| 3,547,811 | 12/1970 | McWhirter | 261/26 X |
| 3,560,376 | 2/1971 | Heil | 210/220 X |
| 4,029,581 | 6/1977 | Clough, Jr. et al. | 261/124 X |
| 4,371,383 | 2/1983 | Rost | 55/169 |
| 4,415,452 | 11/1983 | Heil et al. | 210/220 X |
| 4,491,549 | 11/1985 | Fischer et al. | 261/124 X |
| 4,501,664 | 2/1985 | Heil et al. | 210/220 X |

Primary Examiner—Richard L. Chiesa
Attorney, Agent, or Firm—Daniel H. Kane, Jr.

[57] ABSTRACT

A diffused bubble aeration system for small scale water supplies includes a plurality of water holding vessels having water inlet and water outlet couplings operatively coupled in series for series flow of water through the successive vessels. The inlet and outlet openings are located substantially below the normal water level in the vessels, for example, substantially at the mid section of the respective vessels for equalization of volume and water level in the vessels. The series coupled vessels, barrels or drums comprise a first vessel having a supply water inlet coupling for coupling to a water supply and a last vessel or drum with a treated supply water outlet coupling to treated water supply water pump and pressurized treated water storage tank. Each vessel or drum is assembled to constitute a diffused bubble aeration stage having a spiral coil air diffuser arranged near the bottom of the vessel but spaced from the bottom of the vessel or drum for delivering diffuse low pressure air bubbles for stripping and purging volatile contaminants from supply water in the vessel. Each vessel or drum is formed with air inlet and outlet couplings with air inlet and outlet couplings and lines operatively coupled in parallel for parallel flow of diffused air through the water in the vessels or drums. The air outlet coupling at the top of each vessel vents the contaminant laden air. The drums or vessels comprise multiple stages for staged bubble aeration and staged flow or plug flow of supply water passing through the stages. The volume capacity of the drums is selected for residence time of supply water in the multiple stages adequate for staged aeration stripping and removal of volatile contaminants to a selected limit without substantial mixing between stages during aeration and while meeting current demand for supply water.

14 Claims, 17 Drawing Figures

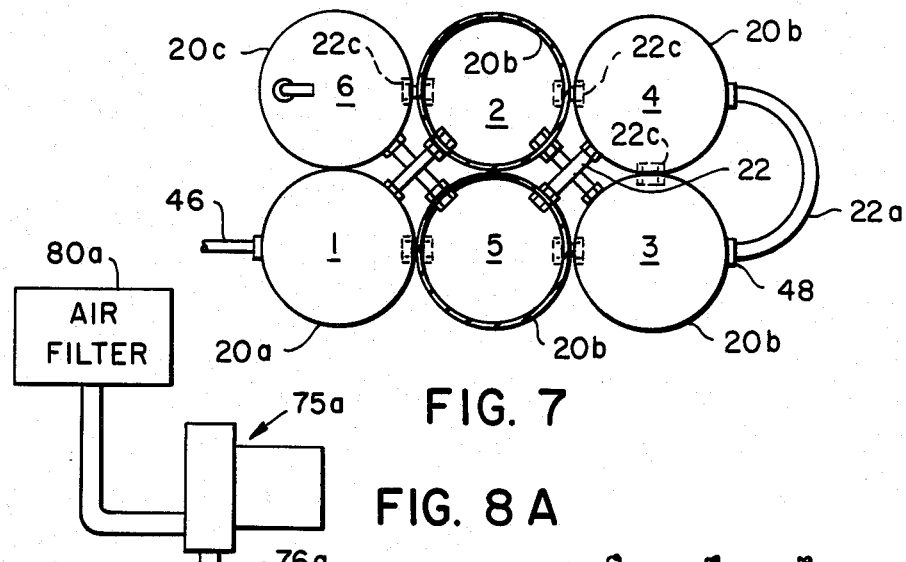
FIG. 7
FIG. 8A
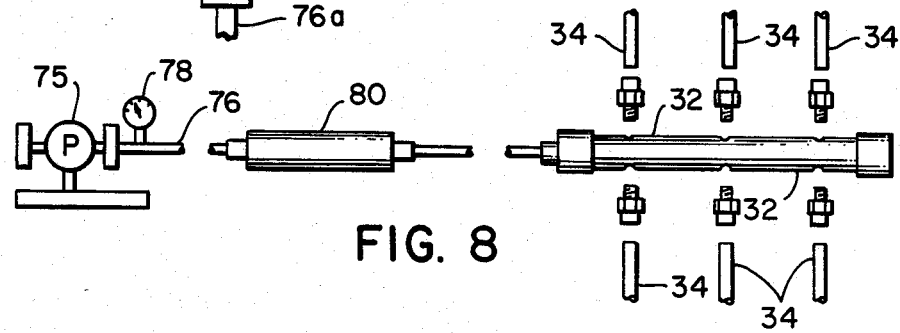
FIG. 8
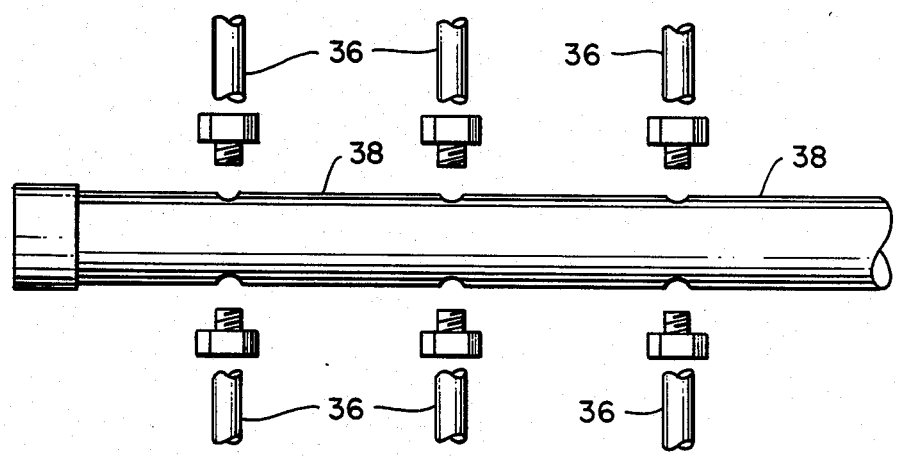
FIG. 9

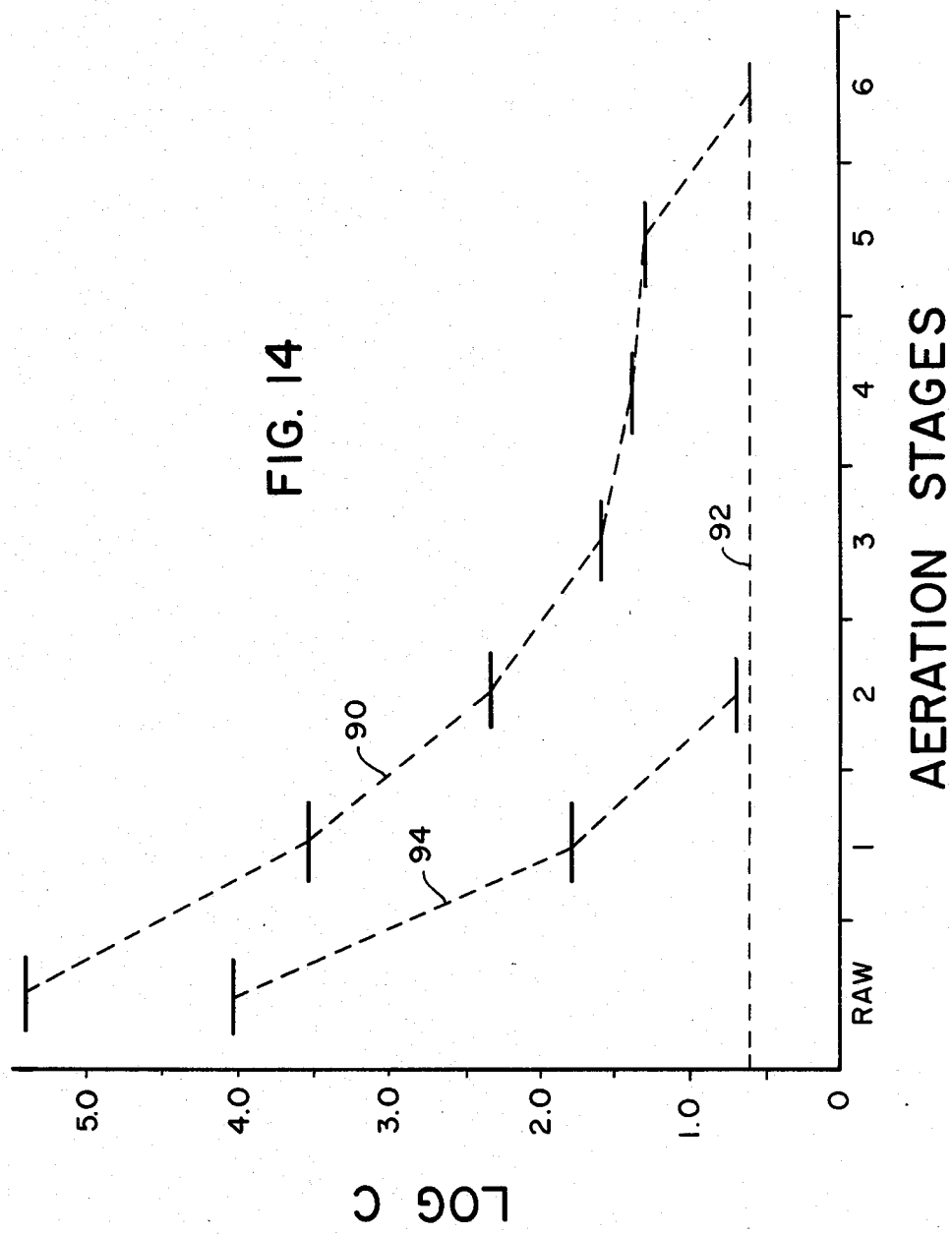

DIFFUSED BUBBLE AERATION SYSTEM

TECHNICAL FIELD

This invention relates to a new diffused bubble aeration system for treating domestic and small scale water supplies and restoring potable water quality. The invention is particularly concerned with water treatment for removal of volatile contaminants such as gasoline and oil.

BACKGROUND ART

Contamination of domestic water supplies by harmful or objectionable compounds is of increasing concern in areas of the country which rely upon ground water. Ground water source contamination by thousands of abandoned and unattended underground gasoline and oil tanks is a growing national problem. Migration of toxic or hazardous gasoline additives through the soil is particularly troublesome. Risk is also posed by the radioactive gas Radon 222 increasingly discovered in water sources of New England and other regions of the country. Very high levels have been measured in well water supplies at locations in Maine and New Hampshire originating from granitic rock with relatively high uranium content. Pesticide residues are found in wells throughout areas such as the Connecticut River Valley following years of chemical pesticide application. Moreover, groundwater supplies in many areas of the country carry objectionable odors from naturally occurring sulfur compounds.

Community water supplies and water companies are able to correct some of these problems using large-scale treatment equipment, for example, aeration systems. Typically, however, such aeration systems were developed and used for treatment of sewage and sludge. Representative examples of sewage and organic wastewater aeration treatment 35 systems include the system described in the Mallory U.S. Pat. No. 2,138,349 in which a rotating diffuser of radial porous diffusion tubes rotates at the bottom of a large scale tank. Heil et al. in U.S. Pat. No. 4,501,664 describe a method for treating organic waste liquid and activated sludge which includes two successive aeration compartments followed by a separator and clarifier. In the aeration compartments diffuse air bubbles flocculate and saturate the sludge. In the Clough et al. U.S. Pat. No. 4,029,581 inflatable cells disposed at the bottom of a tank or pool are sequentially inflated and deflated for agitating the sewage. Release of air through orifices of the cells provides aeration.

A number of aeration systems have been proposed for domestic water treatment. Schleyer et al. in U.S. Pat. No. 2,872,415 describe the atomization aeration of water in a spinning disk atomizer water treatment apparatus for "complete elimination of objectionable absorbed gases and complete oxidization of oxidizable substances". U.S. Pat. No. 4,371,383 describes a radon removal system for spraying, recycling and respraying water in a reactor tank "to purge the water of radon gas . . . breaking up the water droplets for release of radon gas." In U.S. Pat. No. 4,491,549 jets of gas are injected for bubbling through a tank.

A disadvantage of these proposed prior art systems for aeration purging, oxidizing, and eliminating volatile contaminants from domestic water supplies is that relatively large, separate, and expensive appliances are required to be installed in the home or other building. Furthermore, this prior art is not directed specifically to the problem of aeration purifying a domestic water source contaminated with gasoline and oil.

One method of treating domestic water supplies to remove gasoline and oil components uses activated charcoal or carbon filter systems. Typically, one to three granular activated carbon (GAC) units or beds are used for water treatment to control taste and odor-causing contaminants. Such GAC units are often utilized as a short-term solution for gasoline contamination until an alternative supply can be secured. Generally, multiple units or beds are required in series because of the potential for early breakthrough of contaminants in single unit systems and to meet the restrictive breakthrough criteria for drinking water supplies.

While the initial capital cost for installation of GAC treatment systems may be comparable to aeration systems, the maintenance of the system and regular bed replacement is costly. Other disadvantages of GAC treatment systems include the potential for biological growth, costly sampling and monitoring to determine the presence of harmful breakthrough of contaminants which may occur at levels below taste and odor thresholds, and the extremely high operating cost for wells that contain high concentrations of gasoline. Furthermore, pretreatment of the water supply may be necessary for iron and manganese removal to protect the GAC filters.

The treatment of water supplies for gasoline contamination is particularly problematic because of the hundreds of components contained in gasoline. It is difficult to set meaningful breakthrough criteria for GAC treatment systems for all of the components. Only a few of the components in gasoline have EPA guidelines for exposure through drinking water and these guidelines are controversial. From a practical standpoint, the homeowner requires removal of any residual contaminants in the treated water detectable by odor or taste. As a result, the cost of GAC treatment rises accordingly. Ideally, all volatile contaminants should be removed or stripped from the drinking water to a level below the limits of detection.

Reverse osmosis technology may be used for treating contaminated supplies to drinking water quality and commercial units are available to treat entire household water supplies. However, reverse osmosis systems have four basic problems which make their application unlikely. Such systems are more costly than GAC treatment, use a water volume of at least four times the normal supply, require a higher operating water pressure, and produce a waste stream of three to four volumes per treated volume with a higher contamination level than the raw water.

Municipal-scale treatment of water supplies contaminated with volatile organic compounds (VOC's) includes aeration systems where venting of the stripped VOC's is permitted. The various methods of aeration include diffused aeration, spray aeration, mechanical surface aeration, and packed tower aeration. Packed tower aeration may require an unrealistic tower height for highly contaminated wells and water supplies making diffused aeration the most practical alternative. Lowry et al., "Proceedings of the National Well Water Association Conference", Portland, Me., July 1985, published Sept. 1985. However, the prior art does not include domestic scale water treatment with continuous staged flow approximating "plug flow" for stripping volatile contaminants from a water supply and restoring potable water quality on demand.

OBJECTS OF THE INVENTION

It is therefore an object of the present invention to provide an inexpensive, small-scale or domestic-scale diffused bubble aeration system for restoring potable drinking water quality to supply water which has been contaminated with gasoline, oil, or other volatile compounds.

Another object of the invention is to provide a domestic-scale water purifying system for stripping contaminants from supply water with fine bubble diffusion to levels below detection limits and for supplying the purified water substantially on demand for meeting domestic needs without significant imitation on volume of use.

A further object of the invention is to provide a staged flow-through bubble aeration system substantially approximating "plug flow" without intermixing between the successive stages or "plugs" of the flow-through system but with thorough mixing by diffused aeration within each stage or plug.

DISCLOSURE OF THE INVENTION

In order to accomplish these results, the present invention provides a diffuse bubble aeration system for small scale water supplies including a plurality of water holding vessels having water inlet and water outlet couplings operatively coupled in series for series flow of water through the successive vessels. The inlet and outlet openings are located substantially below the normal water level in the vessels, for example, substantially at the mid section of the respective vessels for equalization of volume and water level in the vessels. The series coupled vessels, barrels or drums comprise a first vessel having a supply water inlet coupling for coupling to a water supply and receiving influent supply water. The last vessel or drum is provided with a supply water outlet coupling for coupling to the water pump and pressurized storage tank of a small scale water supply.

Each vessel or drum is assembled to constitute a diffused bubble aeration stage having an air diffuser arranged near the bottom of the vessel but spaced from the bottom of the vessel or drum for delivering diffused low pressure air bubbles for stripping and purging volatile contaminants from supply water in the vessel. Each vessel or drum is formed with air inlet and outlet couplings with air inlet and outlet lines operatively coupled in parallel for parallel flow of diffused air through the water in the vessels or drums. The air inlet coupling is operatively coupled to the air diffuser for generating a column of fine bubbles across the area of the barrel. The air outlet coupling is operatively at the top of the vessel to a vent plenum for venting contaminant laden air from the top of each vessel or drum after diffusion of the air through supply water in the vessel.

According to the invention, the drums or vessels comprise multiple stages for staged bubble aeration of supply water passing through the stages. The volume capacity of the drums is selected for residence time of supply water in the multiple stages adequate for staged aeration stripping and removal of volatile contaminants to a selected limit without substantial mixing between stages while meeting current demand for and consumption of the supply water. When water is drawn from the last vessel or drum, water flows forward through the preceding vessels substantially at the same time, equalizing water levels and volumes in the vessels. Restrictions may be included in the lines joining the vessels for restricting or slowing down flow to match the equalizing water flow rate with the recovery rate of the well or other water source supplying water to the diffused bubble aeration system.

Finally, the system includes electrical controls including water pump relay switch, air pump relay switch and off delay timer, for stripping contaminants from supply water passing in series through the vessels during selected time periods and at selected rates upon operation of a water supply water pump associated with the aeration system. An optional manual override or demand switch or an optional override timer switch for the air pump may be included for prolonged operation in the event of highly contaminated wells.

In a preferred embodiment, the air diffuser comprises a spiral coil at the base of each vessel having small diameter perforations distributed substantially uniformly along the spiral coil for delivering diffuse bubbles for aeration of water in the vessel. A spiral coil mounting spaces the spiral coil above the base of the vessel to facilitate and enhance mixing and circulation of water in the vessel. Furthermore, the air diffuser extends substantially across the cross sectional area of the drum or vessel for delivering a column of diffuse air bubbles throughout the volume of the barrel or drum. A single air inlet line may be provided delivering air to one end of the spiral or double air inlet lines may be provided delivering low pressure high volume air to both ends of the spiral simultaneously for more effective volume delivery of diffused air bubbles. Multiple air inlets may also be used to deliver low pressure high volume air at multiple locations along the spiral.

In a preferred example embodiment, the diffuser and support are suspended floating above the bottom of the vessel or barrel. The spacing of diffuser and the diffuser support from the bottom of the barrel permits greater mixing and aeration circulation within the barrel stage or plug.

The invention contemplates providing a plurality of stages preferably up to six to eight stages for substantially approaching and achieving the benefits of plug flow, stage flow, or piston flow with thorough mixing of cells, plugs, or staged volumes of water within each vessel stage without intermixing between stages and while responding to and satisfying demand consumption of the supply water.

Other objects, features, and advantages of the invention are apparent in the following specification and accompanying drawings.

BRIEF DESCRIPTION OF THE DRAWINGS

FIG. 6a is a perspective view of the cross braces which mount the spiral diffuser near the bottom of the barrel, while

FIG. 7 is a plan view from above in partial cross section of the six stage diffused bubble aeration system arranged in compact configuration.

FIG. 8 is a fragmentary exploded diagrammatic view of the air inlet manifold and air inlet supply lines while FIG. 8a is a fragmentary diagrammatic view of a preferred ring compressor pump and upstream air filter.

FIG. 9 is a fragmentary plan view of the air outlet manifold and air outlet vent lines.

FIG. 14 is a graph of the logarithm of the concentration of contaminants of supply water passing through successive stages of the bubble aeration system.

DESCRIPTION OF PREFERRED EXAMPLE EMBODIMENTS AND BEST MODE OF THE INVENTION

Figure 1:
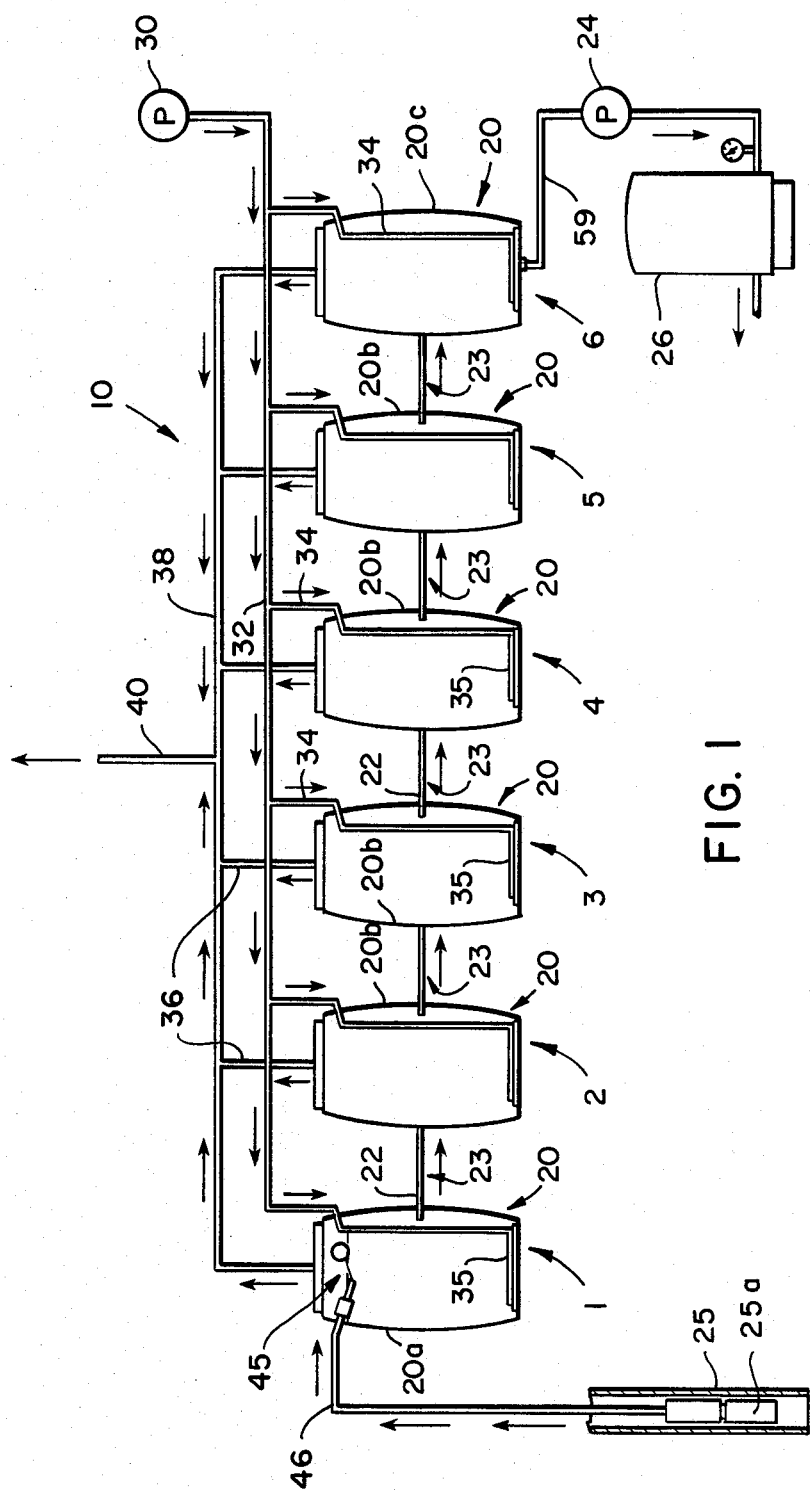
FIG. 1 is a system diagrammatic view of a six stage diffused bubble aeration system according to the invention.

A diffused bubble aeration water purifying system 10 according to the present invention is illustrated in the schematic diagram of FIG. 1. The system is a staged flow-through bubble aeration system having six stages 1-6. Each stage includes a closed vessel or barrel 20. The vessels 20 are coupled in series by the water supply line 22 for staged flow of supply water in series through the vessels 20. Vessel size is selected to afford a sufficient hydraulic detention or retention period depending upon a number of parameters as hereafter described including the contaminant profile of the supply water, rate of aeration, rate of water use and time of aeration. The supply water is drawn by treated supply water pump 24 through the series coupled stages from a household or small scale water supply, not shown, for staged flow through the series coupled vessels to the treated water pressure storage tank 26. The pressurized tank 26 delivers the treated water for domestic use or other small-scale water supply use.

While the water to be treated and stripped of volatile contaminants passes in series through the vessel stages, stripping air passes in parallel from the bottom of the vessels to the top. As shown in FIG. 1, low pressure air is delivered by a dry air pump 30 through an inlet air delivery plenum 32 and parallel air delivery lines 34 to spiral bubble aeration diffusers 35 positioned or mounted near the base of each vessel 20. The spiral diffusers 35 are preferably spaced from the bottom of the vessel, by, for example, floating suspension subsequently described with reference to FIG. 13. The spiral bubble aeration diffusers 35 are constructed and arranged as hereafter described to deliver stripping air in the form of fine diffuse bubbles for stripping, purging and releasing volatile contaminants from water resident in the respective vessels. The contaminant-laden air collecting at the top of each vessel passes through the parallel outlets or vent lines 36 to the outlet or vent plenum 38 and through the common outlet 40 to the atmosphere.

Thus, the supply water being treated and purified passes in stages or "plugs" through the successive series coupled barrels or vessels by equalizing flow when water is drawn from the last vessel into the pressure tank 26. While resident in a vessel, each stage or plug is subjected to thorough mixing by diffuse bubble aeration from the diffuser. The purging air is distributed in parallel to the diffusers 35 at the bottom of each barrel 20. The fine diffused bubbles of low pressure air pass upward through the plug or stage of water in each vessel foaming the water and expelling, stripping and liberating contaminants.

A feature and advantage of this arrangement is that the flow-through of treated supply water approximates "plug flow" with thorough intermixing and bubble aeration of water in each plug or stage but substantially without lateral or longitudinal intermixing between stages. Thus, each stage or plug undergoes successively increasing catharsis and purification in the successive stages until all volatile contaminants are removed below the level of detection by applicable physical and chemical methods of detection.

In order to match the equalizing lateral flow of supply water between stages with the recovery rate of a particular well or water supply, a flow control element or configuration may be interposed in the supply line 22 between successive stages particularly for high volume water users. Most simply, a fixed orifice or restriction may be included in the series coupling supply line 22 between successive vessels for example between stages 4 and 5 to damp water flow during equalization and thereby slow down the rate at which the last two vessels at stages 5 and 6 and filled. The restriction size is calculated according to the recovery rate of the well water supply and serves to increase the aeration time experienced by the water before it enters the last vessel at stage 6.

Figure 2:
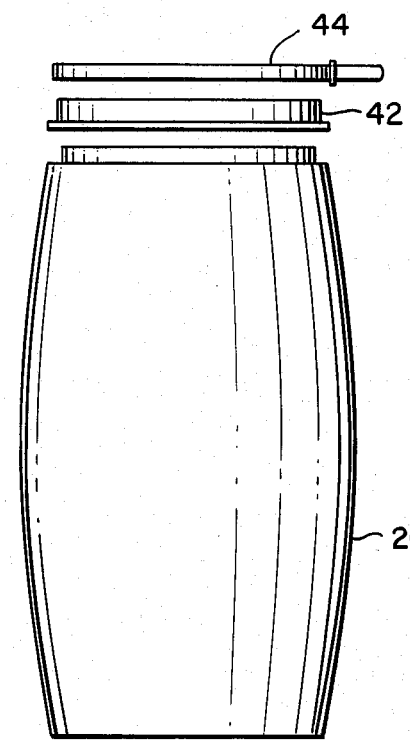
FIG. 2 is an exploded side elevation view of one of the drums or barrels.

As shown in FIG. 2, each vessel is an open head drum 20 which is closed at the top by a polyethylene top or cover 42 held in place with a gasket and steel locking band 44. The vessel or barrel 20 is typically a polyethylene drum approved by the FDA for contacting and containing food or water for human consumption. The sealable enclosure at the top prevents entry of external contaminants. The first barrel 20a of the staged series, illustrated in FIG. 3, includes a float valve 45 positioned near the top of the vessel to shut off the inlet supply of water through inlet line 46 from the well or other water supply.

Typically the domestic or small scale water supply delivering water to the diffused bubble aeration system includes a well, a well pump in the form of a submersible or surface pump, and a pressurized hydropneumatic tank for storing well water pumped under pressure. When the level of water drops in the vessel 20a of the first stage, stage 1 of the diffused bubble aeration system, the float valve opens, and water from the water supply including the hydropneumatic tank is admitted until the rise in water level in vessel 20a closes the float valve once again.

The inlet line 46 of the first barrel or drum 20a enters through an inlet 47 provided by a bulkhead type fitting at the top of the drum. When the water level in the first barrel 20a approaches the top of the barrel the float valve 45 closes the inlet line 46 in order to prevent overfilling and overloading the aeration system. After a specified average residence time in the first vessel 20a, the treated water from the first stage exits the first vessel 20a drawn by equalizing flow through outlet 48 at the middle of the barrel into the series coupling water flow line 22 to the next vessel. The water flow line 22 may be coupled to respective vessels, drums, or stages through bulkhead fittings.

Figure 4:
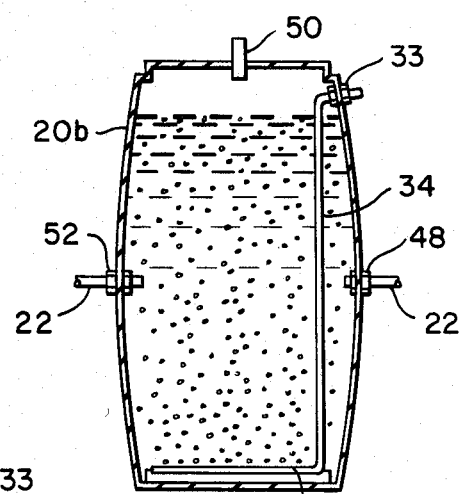
FIG. 4 is a side cross section view through one of the intermediate stage drums or barrels.

The pressurized air at a relatively low pressure of for example 1.5–3 psig passes into the vessel at a bulkhead fitting at air inlet opening 33 through the air inlet line 34 to the spiral diffuser 35, hereafter described, where the air exists in a stream of fine diffuse bubbles aerating the plug or stage of water resident in the first vessel 20a. Contaminant-laden air collects at the top of the vessel and exits through the air outlet 50 and the parallel line 36 which is in turn coupled to the air outlet plenum 38 and vent 40 to the atmosphere. The second through fifth stages provided by polyethylene drums or intermediate drums 20b of the staged series are each in the configuration illustrated in FIG. 4. The supply water being treated enters the intermediate stage barrels or drums 20b in the series coupling water flow line 22 through a bulkhead fitting at inlet opening 52 approximately at the mid-section of the barrel and exits from the vessel 20b re-entering flow line 22 through outlet 48, also located approximately at the middle section of the vessel all below the average or normal water level.

The pressurized air at relatively low pressure passes through air inlet line 34 at inlet opening 33 to the spiral diffuser 35 in the same manner as the first barrel 20a and the air exits the diffuser 35 in a broad stream or column of fine diffuse bubbles foaming and aerating the plug or stage of water resident in the intermediate vessel or barrel 20b. The broad stream or column of fine diffuse bubbles extends substantially across the entire diameter or cross section of barrel or drum. In each instance the thorough diffuse bubble aeration mixing takes place within the respective stage or plug of supply water resident in the respective vessel. A feature and advantage of this arrangement is that there is little lateral mixing between stages as the "plugs" of water pass through the successive stages for diffuse bubble aeration mixing and purging. Contaminant laden air collects at the top of the vessel or drum and exits through the air outlet 50 to the air outlet plenum as heretofore described.

Figure 5:
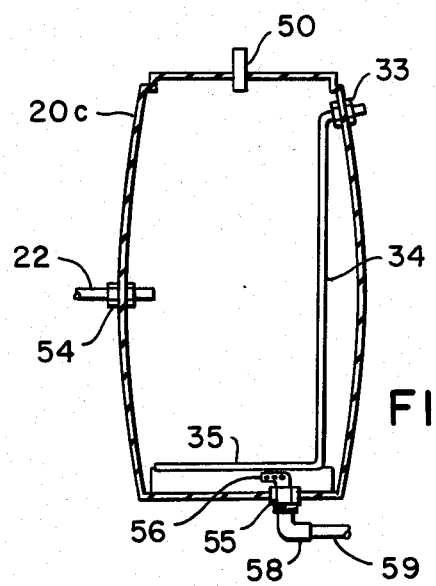
FIG. 5 is a side cross section view through the last stage barrel or drum.

The final stage drum or vessel 20c of the staged series is illustrated in FIG. 5. The supply water being treated enters the final stage from the water flow line 22 through the inlet 54 provided by a bulkhead fitting substantially at the middle section of the drum 20c. The final outlet 55 from the staged series and final drum or vessel 20c is provided by a bulkhead fitting at the bottom of the vessel or barrel. The intake 56 for this final treated water outlet is provided for example by a length of plastic pipe such as black polyethylene plugged at the end with drilled holes on the sides for intake of treated water. The outlet 55 and its intake 56 are positioned below the spiral diffuser 35 to avoid entrainment of air bubbles from diffuser 35 in the treated water outflow. The elbow 58 provides a coupling to an outlet line 59 which leads to the treated supply water pump 24 and pressurized treated water storage tank 26 which stores and delivers the diffuse bubble aeration treated water at regulated pressure.

Thus in a typical domestic household or small scale water supply, the diffuse bubble aeration system is installed in the water supply line downstream from the owners own well pump and pressurized hydropneumatic tank in the break in the line. The untreated well water is stored in the pressurized tank, not shown. After treatment in the diffuse bubble aeration system the treated water is pumped by treated water supply pump 24 into the pressurized treated water storage tank 26 at the desired system pressure. The system of the present invention is therefore typically "sandwiched" between two pump and tanks although the system may be readily coupled into other types of water supplies.

Figure 6:
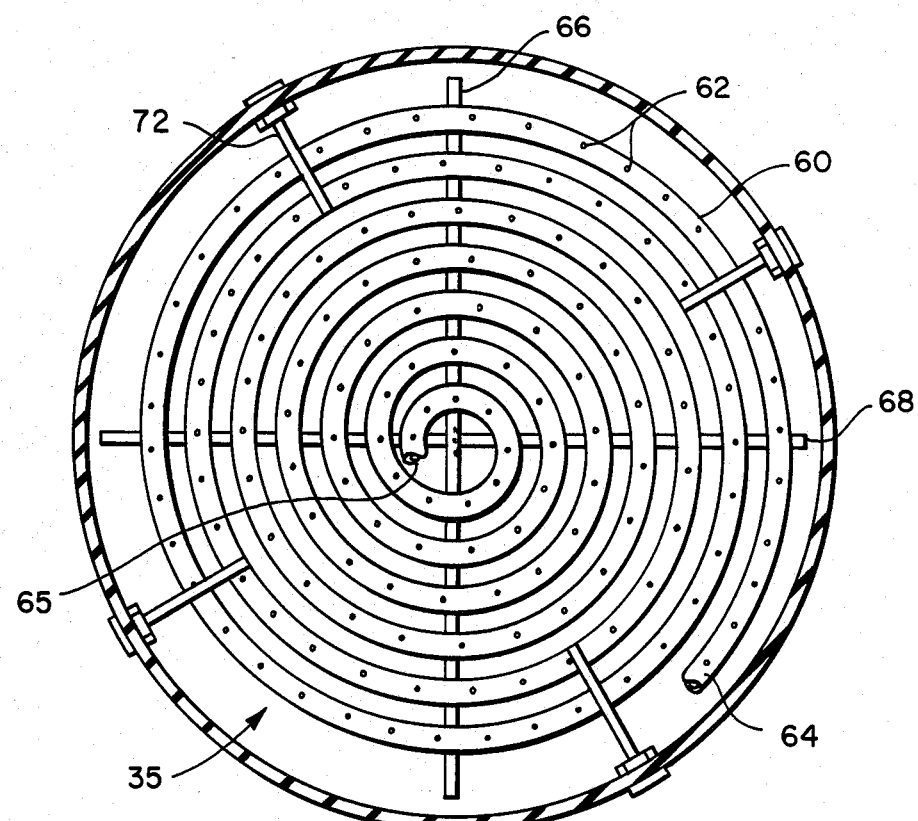
FIG. 6 is a cross sectional view from above into one of the barrels or drums providing a fragmentary plan view of the spiral coil air diffuser.

A fine bubble diffuser suitable for use in the bubble aeration stages of the present invention is illustrated in FIG. 6. The spiral configuration air diffuser 60 is provided by, for example, multiple turns of increasing radius of a flexible tubing such as ½-inch (12.7 mm) outer diameter polyethylene tubing. The upward facing surfaces of the tubing are formed or punched with generally uniformly spaced holes of small diameter such as, for example, 0.025-inch (0.06 cm) diameter holes. Such finely punched holes provide comparably fine bubble diffusion from low pressurized air delivered on the air inlet line 34 which is joined or coupled to the outer end 64 of the spiral diffuser tubing. According to one embodiment of the invention, the inside end 65 of the tubing is plugged or closed so that all of the supply air delivered by inlet line 34 exits through the fine diffusing holes 62. According to an alternative embodiment of the fine bubble air diffuser hereafter described with reference to FIG. 12, a parallel air delivery line is also coupled to the inside end 65 of the spiral configuration diffuser to decrease pressure head loss through air inlet fittings by increasing the number of parallel inlet fittings for air delivery. Multiple inlet air lines may also be used joined to the diffuser at multiple locations along the spiral.

The area of the spiral coincides substantially with the cross section area of the vessel or drum. In other words, the diameter of the spiral extends substantially to the diameter of the drum. As a result, the spiral diffuser delivers a column of diffuse bubbles which thoroughly foams and aeration mixes the entire column of water in the drum. The turns of the spiral are substantially equally spaced for delivery of a uniform density of diffuse bubbles. A feature and advantage of this spiral configuration is that the entire cross sectional area of water in the drum is subjected to uniform diffused bubble aeration and mixing.

Figure 6A:
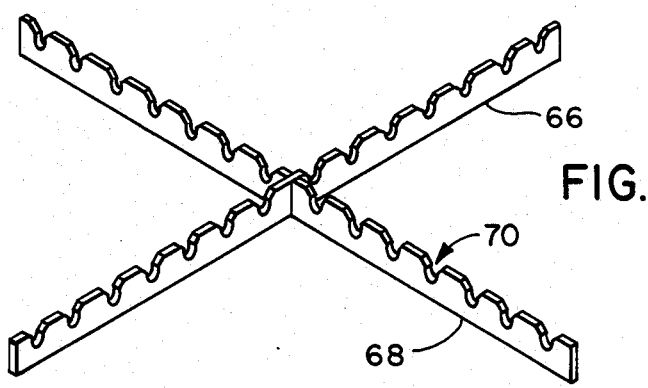
Figure 6B:
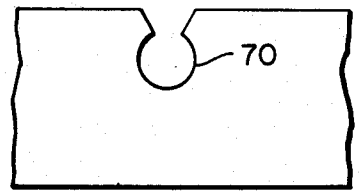
FIG. 6b is a detail fragmentary view of one of the coil receivers formed in the cross braces.

The spiral configuration tubing may be mounted on a base, e.g., formed by cross supports 66 and 68 shown in more detail in FIGS. 6A and 6B. The interfitting or interlocking cross supports 66 and 68 are formed along the top edge with substantially evenly spaced circular cross section tube inserts 70 for receiving and holding the substantially equally spaced spiral turns of the diffuser tubing. The cross pieces 66 and 68 are preferably located or supported for example by floating above the bottom of the vessel or drum by, for example, 6 inches (15 cm). The diffuser and supports 66 and 68 may be suspended by floating at a desired spacing height or distance from the bottom of the vessel and held at the desired spacing from the bottom by floating against the bolts 72. Additional supports may also be provided between the supporting cross pieces 66 and 68 to provide further support for the outer turns of the spiral tubing. A typical height for the cross braces 66 and 68 is for example 1½ inches (3.8 cm). In the final stage barrel 20c of the staged series a spacing of, for example, 6 inches (15 cm) from the bottom provides necessary clearance between the diffuser and the bottom of the barrel to accommodate the outlet 56. The braces may be fabricated from, for example, ¼-inch (0.6 cm) thickness polyethylene approved by the FDA for contact with food and beverages.

Figure 13:
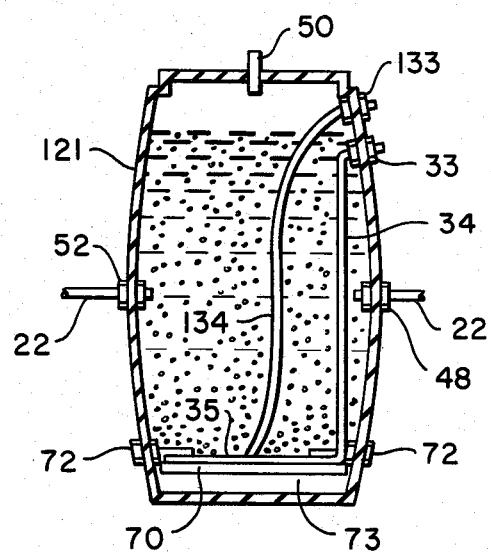
FIG. 13 is a side cross section view of a preferred barrel or drum with a floating diffuser in which the diffuser and its support float spaced from the bottom of the barrel or drum.

According to a preferred arrangement for retaining the diffuser 35 in place near the base or bottom of the barrel or drum, holes are drilled through the wall of the drum at spaced intervals around the drum at the desired location of the spiral coil diffuser above the bottom or base of the drum, for example, 6 inches (15 cm). Bolts 72 are inserted through the holes projecting into the drum above the spiral diffuser and the bolt is secured in position using O-ring seals to seal the holes through which the bolts pass. The spiral diffuser and its cross brace mounting is positioned below the bolts and floats upward resting against the inwardly projecting ends of the bolts 72 as shown in the barrel 121 of FIG. 13. In this manner the spiral coil diffuser is maintained at a desired spaced height above the base of the drum without rising further and without the necessity of welding or bonding the mounting braces to the surface of the drum or without the necessity of weighting the spiral coil diffuser although these arrangements provide operative though less preferred alternatives. For example, the bolts 72 illustrated in FIGS. 6 and 13 are placed above the spiral coil diffuser and sealed in place with O-ring seals preventing the spiral coil diffuser from rising above the level of the bolts.

An important feature of the arrangement and placement of the spiral coil diffuser is the spacing 73 from the bottom of the barrel or drum. This spacing permits and enhances circulation and mixing of the water in each stage during diffused bubble aeration as illustrated in FIG. 13.

An efficient and compact spatial arrangement for the six stages of the multi-stage diffused bubble aeration system is illustrated in FIG. 7. The six stages of circular cross section drums or barrels are arranged contiguously in two rows of three barrels in an alternating sequence between the rows. The segmented series coupling supply water line 22 is coupled alternately between barrels in the opposite rows. The sequence progresses from the first stage barrel or drum 20a through the intermediate stages or barrels 20b in one direction alternating between rows, and then returning in the other direction alternating between rows to the last stage barrel 20c which is positioned adjacent to the first stage barrel 20a. The bulkhead fittings are arranged to take advantage of the space between diagonally adjacent barrels of the two rows. At the end of the two rows the outlet 48 from the third stage barrel designated by the numeral 3 may be coupled by segment 22a of the water supply line 22 to the inlet 52 of the fourth stage designated by numeral 4 for return back down the rows. Alternatively, a direct line segment 22c may be coupled through bulkhead fittings directly between vessel stages 3 and 4 as shown in dotted outline in FIG. 7. Thus, the progression of supply water during treatment in the successive stages is indicated by the stage sequence numerals 1-6, as shown in FIG. 7.

Alternatively, additional direct line segments 22c can be coupled directly between each of the adjacent vessels or barrels 20 as shown in dotted outline in FIG. 7. In that arrangement, the series water flow between barrels progresses in the order 1,5,3,4,2,6 referring to the stage number designations of FIG. 7. Thus, water from the water supply entering the first stage barrel 20a progresses through stages 5,3,4 and 2 to the last stage barrel 20c. In either event, the 6 stages are arranged compactly and may be placed on a stand, supporting the barrels or vessels above the ground. A cover may also be placed over the system.

Details of an air supply line are illustrated in FIG. 8. Relatively low pressurized air for example in the range of 1.5-3 psig is delivered, by the air vacuum pump 75 through polyethylene tubing 76 to which an optional pressure gauge 78 is coupled, to an air filter 80 such as a stainless steel housed air filter clamped in the polyethylene line. The diffusion air is distributed from the air manifold 32 to the respective parallel air supply lines 34 which are coupled respectively through bulkhead fittings to the inside of the respective barrels or drums of the six stages. The air supply lines 34 are respectively coupled to the outer ends 64 of the spiral configuration diffusers 60 mounted at the base of each of the barrels or vessels 20.

Alternatively, a ring compressor air pump 75a is used with an air filter and silencer 80a at the air inlet upstream from the air pump as shown in FIG. 8A. The outlet 76a is coupled directly to the air manifold 32. Furthermore, two outlets and air lines may be coupled to the manifold 32 for each vessel or stage according to the embodiments of FIGS. 12 and 13. In that event twelve outlets from manifold 32 would be used instead of the six shown in FIG. 8.

The fine diffuse air bubbles passing through each stage or plug of water in the multi-stage bubble aeration system collect in the space at the top of each barrel or drum and there exit through contaminated air outlet lines 36 to the vent manifold 38 shown in FIG. 9, which is in turn coupled to an outlet vent to the atmosphere. The air inlet and air outlet configurations over the vessels may of course be varied, for example, for more compact arrangements to accommodate a cover over the system and vessels.

The inlet diffusion air manifold 32 and contaminated air outlet manifold 38 may be provided for example by Schedule 80 2-inch (5 cm) diameter PVC pipe, while the inlet air lines 34 and outlet air lines 36 are typically ½-inch (12.7 mm) and ¾-inch (18 mm) respectively polyethylene tubing. The inlet and outlet air lines 34 and 36 are coupled to the respective inlet and outlet manifolds 32 and 38 by appropriate adapters.

An alternative arrangement for the air vent or air outlet lines is simply to couple the air outlet lines 36 in series to common vent lines using "tee" joints. The common vent lines then serve as the vent manifold. A feature and advantage of this arrangement is that common vent lines, each joining three vessels or barrels can be on either side of the central air supply manifold for a lower profile and more compact configuration of the air system. A cover may then be placed more easily over the bubble aeration system.

Figure 10:
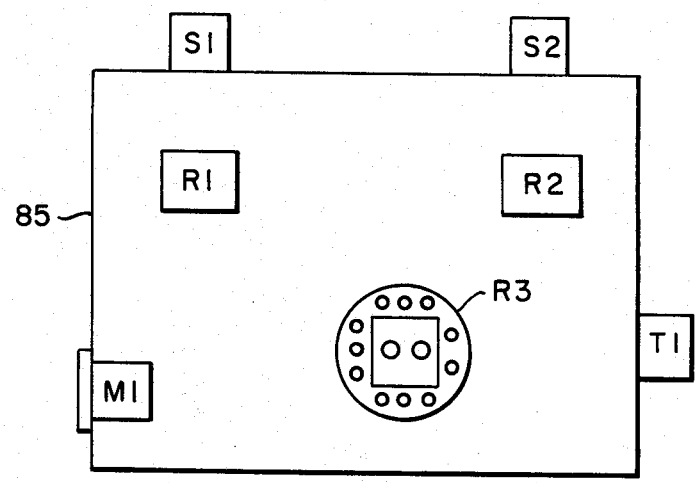
FIG. 10 is a block diagram of the bubble aeration system controls.
Figure 11:
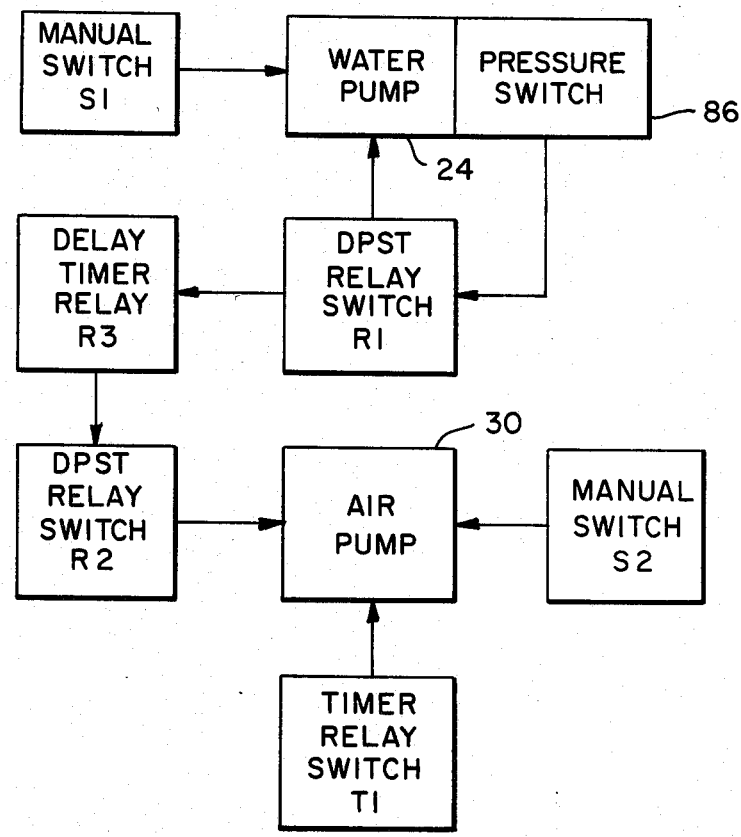
FIG. 11 is a block diagram flow chart illustrating operation of the control system.

A control box 85 for operation of the diffused bubble aeration system according to the invention is illustrated in FIG. 10, while a flow chart explaining the operation of the control box and system is illustrated in FIG. 11. In operation of the system the water pump 24 turns on in response to a pressure switch 86 to maintain water pressure in the hydropneumatic tank 26 between the cut-in pressure of 20 to 30 psig and the shutoff pressure of 40 to 50 psig. For a typical domestic water supply system the volume of water between the cut-in and shutoff pressure settings is approximately five gallons (21 liters). When five gallons (21 liters) have been used, the DPST relay switch R1 is energized by the pressure switch 86 on pump 24 and closes the contacts on delay timer relay R3. The delay timer relay R3 in turn closes the contacts on DPST relay switch R2 turning on the air pump motor and low pressure air pump 30. At the same time the timer relay R3 begins a timing cycle adjustable for maintaining air pump operation during a specified period selected according to the parameters of water use, water contamination, aeration rate, etc. The air pump is turned off after the timer relay R3 completes the timing of a selected time period cycle.

If the pressure switch 86 and relay R1 operate before the timer relay R3 completes a specified time cycle as a result of continued water usage, the relay timer R3 is automatically reset and begins another timing cycle. In addition, for highly contaminated wells an overriding timer relay switch T1 can be used to turn the air pump 30 on at predetermined times during the day. Optional manual switch S2 provides additional manual override control for turning the air pump 30 on and off.

Figure 12:
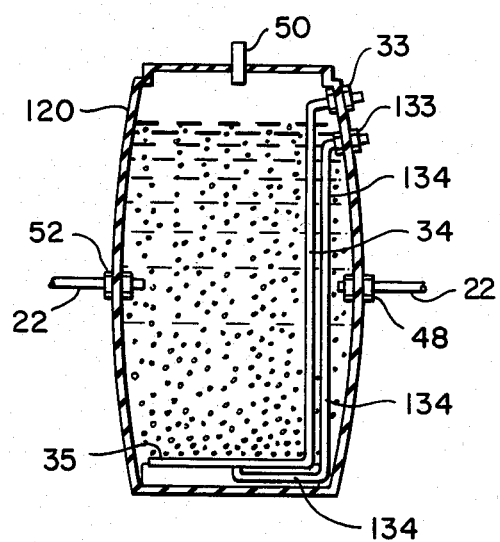
FIG. 12 is a side cross section view of an alternate barrel or drum with two air inlet lines coupled to each end of the spiral coil diffuser.

An alternative water holding vessel or drum for the diffused bubble aeration stages of the water purification system is illustrated in FIG. 12. The drum or barrel 120 is similar to the polyethylene drums 20 described with reference to FIGS. 2-5, particularly the intermediate stage drum 20b of FIG. 4 and corresponding elements are designated by the same reference numerals. In addition, however, the water holding vessel or drum 120 is provided with an air inlet comprising two inlet air lines 34 and 134 coupled respectively at the air inlet couplings 33 and 133 provided by bulkhead fittings. The inlet air lines 34 and 134 are coupled respectively in parallel to the air inlet manifold 32 at separate exits from the inlet air manifold thereby reducing pressure drop through the air supply system. According to this arrangement, the air inlet manifold 32 is provided with twelve parallel exit couplings rather than the six exit couplings illustrated in FIG. 8. Thus, each of the vessels may be provided with two inlet air lines 34 and 134 from the inlet air manifold.

One of the air inlet lines 34 is coupled to the outer end 64 of the spiral coil diffuser illustrated in FIG. 6. the second air inlet line 134 is coupled to the inner end 65 of the spiral coil diffuser 35, also shown in FIG. 6. The second air inlet line 134 may be placed down the side of the water vessel or drum 120 and then brought underneath the spiral coil to the inlet end 65 as shown in FIG. 12 or it may simply be placed down the middle of the barrel or drum as shown in FIG. 13. FIG. 13 also shows the preferred floating suspension of the diffuser 35 and diffuser support 70 spaced above the bottom of the vessel and held in place by bolts 72 which prevent the diffuser 35 from floating any higher in the vessel.

The capacity of the multistage diffused bubble aeration system for treating water supplies is dependent upon a number of factors and system parameters. For example, for a typical domestic water supply the average water supply requirement is 40 gallons (152 L) per person per day and 160 gallons (610 L) per day for a family of four. To achieve a desired retention, detention, or residence time for supply water in the bubble aeration system of 1-1.5 days, a six stage system was assembled using six 30-gallon tanks in the form of the polyethylene drums or barrels, as illustrated in FIGS. 2-5. Each of the tanks holds approximately 25 gallons of supply water with a vent space above for a total supply resident in the drum of 150 gallons. For automatic operation the delay timer which controls the duration of operation of the air pump for diffused bubble aeration is set at a desired time setting over a variable range of for example 0-1 hour each time the water pump turns on in response to water supply demand and consumption.

The time setting of the variable delay timer depends upon the level of contamination of the supply water and the contaminant profile, that is the constituent composition of the contaminants and the rate of air delivery or rate of aeration. For example, using a standard ½-hp air pump motor capable of delivering 15-25 ft$^3$/minute of air at 1.4-3 psig, it is desirable that the cumulative time of diffuse bubble aeration of supply water passing through the multiple stages be at least three hours per day. For a typical single family home of a family of four, the water pump is actuated and turns on approximately ten times per day. Therefore, a setting of the variable timer which controls operation of the air pump in the range of fifteen minutes to thirty minutes each time the water pump is actuated will assure cumulative diffuse bubble aeration of the supply water of at least three hours per day. The redundancy afforded by the selected parameters is desirable to accommodate the on/off events which occur in rapid succession overriding each other and the timer delay.

For medium levels of gasoline contamination, for example in the range of 5-10 ppm, the cumulative aeration time for the supply water should be at least five hours per day with the typical setting of the variable timer correspondingly increased. Similarly, for greater levels of contamination, in particular high levels of gasoline ontamination greater than 50 ppm, the minimum cumulative diffuse bubble aeration time of supply water resident in the system of the present invention should be at least 9-10 hours per day.

For higher levels of contamination it is also desirable that a greater capacity air pump and air pump motor of, for example, 1-hp capable of delivering 25-35 ft$^3$/minute at 1.5-3 psig be utilized. The preferred air pump suitable for use in the system of the present invention is a ring compressor pump which requires no lubricating oil which might contaminate the water. The air is filtered through a coarse prefilter and a fine filter such as a 10 micron woven fabric filter of the type used in the beverage and milk industries. This filter system is located upstream from the ring compressor pump at the air inlet to the pump. For higher levels of contamination the manual override switch may be used to increase the aeration time. Additionally, a supplemental timing relay may also be used to achieve the desired cumulative aeration time. An optional elapsed time meter is used to measure the amount of time the air pump has been on and therefore the cumulative diffuse bubble aeration time during the day.

For larger systems, more stages and larger tanks or barrels can be used to increase the capacity of the system. For example, a system was constructed for serving an apartment of four apartment units in which the average water consumption and water supply usage was 100 gallons per day per apartment unit. For this application, a system of eight stages was assembled using 55 gallon polyethylene drums or barrels of the type illustrated in FIGS. 2-5. With a suitable air space or vent space at the top of each barrel, the cumulative capacity of the eight stages was approximately 400 gallons. For this application a larger pump with 1-hp motor delivering 23 ft$^3$/minute at 3 psig was satisfactory.

In any particular diffused bubble aeration system, the cumulative intermittent operation of the system is adjusted and matched for time of aeration, rate of aeration, rate of water use, and residence time through the multiple stages, with the contaminant profile to achieve stripping or purging of all target contaminants below the level of detection, for example, below 5-10 parts per billion (ppb).

A graph showing concentration of contaminants and reduction of contaminants through successive stages by the diffuse bubble aeration system is shown for two examples in FIG. 14. Dotted line 90 is a graph of the sequential reduction in the concentration of contaminants shown as the logarithm of the concentration through the six successive diffused bubble aeration stages at site 1, a contaminated well in the state of Maine with a high level of gasoline contamination greater than 350 ppm total gasoline containing a large fraction of lower boiling point components. This is typical of many wells in the field which show a significant alteration of composition in the contaminating gasoline constituents compared to the original gasoline. This is believed to be caused by the solubility differences of the many compounds in gasoline. A greater portion of the more soluble fractions are dissolved by the groundwater. An extreme example of a soluble and migratory component is methyltertiary butyl ether (MTBE). Because of its high solubility and low Henry's constant of about 0.01 to 0.05, MTBE is also one of the most difficult and intractable to strip or purge from the contaminated water. It may therefore be used as the indicator contaminant for purification. As shown by line 90 in the graph of FIG. 14, by the sixth stage all constituent gasoline contaminants including MTBE were stripped and removed to a level below the level of detection indicated by line 92, for example, approximately 4 micrograms per liter or approximately 4 ppb for MTBE. The pesticide ethylene dibromide (EDB) may be similarly difficult to remove and may therefore serve as an indicator contaminated for purification. On the other hand, the benzene, toluene and xylene components are stripped or purged to a level below the level of detection after approximately three stages.

Figure 3:
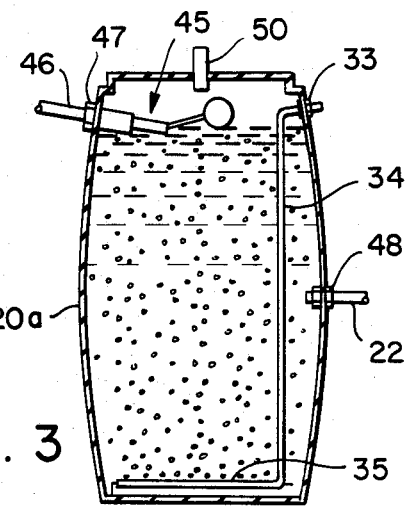
FIG. 3 is a side cross section view through the first stage barrel or drum.

The line 94 in the graph of FIG. 3 is a graph of the concentration of contaminants, more particularly the logarithm of concentration of contaminants in the respective stages for a second site with relatively low level gasoline contamination no greater than 12 milligrams per liter (mg/L) or approximately 12 ppm. At this lower level of contamination all constituent components of the gasoline contamination were reduced to a level below the level of detection in 2-3 stages. In each instance the reference to the level below the level of detection refers to water of drinking water or potable water quality with no detection by odor or taste, as well as no detection by standard chromatogram analysis. In each instance the capacity of the system and system parameters must be adjusted to remove the controlling compound, that is, the most intractable compound, through the successive stages.

In each instance the diffused bubble aeration system was a six-stage system for a single small scale domestic water supply with the system parameters as previously described. The spiral diffusers comprise approximately seventeen feet (5.1 meters) of ½-inch (1.2 cm) diameter polyethylene tubing with approximately 425 fine diffusion holes spaced every ½ inch (1.2 cm) along the length of the turns of the spiral diffuser. With these parameters the spiral coil diffuser delivers fine bubbles for diffusion and mixing approaching the fine bubbles delivered by porous stone diffusers. The diffuser, according to the present invention, however, affords the advantage that it will not tend to plug up as occurs with porous stone diffusers. Pretreatment of the water supply water for iron and maganese removal may be included in the system to protect the diffuser according to the present invention. Moreover, the spiral configuration is arranged for delivering the fine bubbles substantially across the cross-sectional area of the column or plug of water resident in the vessel or stage.

An important feature of the invention is the arrangement of the diffused bubble aeration system into a series of stages which are series coupled with respect to supply water flow in order to approach and achieve the benefits of so-called "plug flow" or "stage flow". Such plug flow or stage flow may be characterized hydraulically as a continuous series flow of a liquid constituting adjacent and sequential plugs or sections each of which is thoroughly mixed within itself but without lateral mixing or intermixing between the plugs or sections. Such ideal plug flow can provide continuous supply of water on demand with continuous mixing and aeration within each cell or plug and without backflow, forward flow or intermixing of water of greater contamination with water of lesser contamination.

The staged aeration system of the present invention with n series coupled stages approaches the ideal plug flow as n approaches infinity. As a practical matter, however, the six stages generally contemplated by the present invention approaches within 95% of plug flow and generally beyond six to eight stages the point of diminishing returns is reached in approximating the benefits of plug flow with the staged aeration system. While the advantages of plug flow can generally only be approached by flow of a fluid through a porous medium or through thin tubing, the present invention achieves these advantages through staged flow, aeration, and mixing in the series coupled staged vessels. Longitudinal mixing between stages is avoided thereby approximating so-called plug flow or piston flow of a series coupled stream of plugs, batches, or cells. Each batch or cell thoroughly intermixes with diffused bubble aeration in the respective stage vessel without backflow, thereafter progressing through to the next vessel. This multiple staging of the total volume of water approaches the advantages of plug flow. Staging or separation into staging reduces the required volume and the required retention time for stripping and purging contaminants despite constant or intermittent demand for and consumption of the supply water. For example, stripping and purging of supply water of the contaminant MTBE to a level below the level of detection would require 1,000 times more volume times retention time for the use of one vessel or tank rather than the series coupled stages contemplated by the present invention. According to the preferred embodiment six to eight stages of six to eight series coupled vessels are used in the staged diffuse bubble aeration system in order to approach and achieve the benefits of 95% of ideal plug flow or piston flow.

On the other hand, for levels of contaminants and for specified contaminants more tractable and more easily stripped and purged from the supply water, fewer stages may be used for particular applications. In some applications three stages are sufficient to remove, for example, toluene, benzene, and xylene below the level of detection. As a general rule, however, according to the preferred embodiment of the invention, six to eight stages are utilized to approach substantially the benefits of plug flow under varying conditions of water supply demand and consumption and to accommodate variations or surges in demand flow without overloading or exceeding the capacity of the system. The staged division of the diffused bubble aeration system according to the invention further reduces the overall total supply water which must be resident or detained within the aeration system at any time to deliver potable water on demand as required in the typical small scale water supply.

While the invention has been described with reference to particular example embodiments, it is intended to cover all modifications and equivalents within the scope of the following claims.

We claim:

1. A diffused bubble aeration system for small scale water supplies comprising:

a plurality of water holding vessels having water inlet and water outlet couplings and supply water line segments operatively coupling the water holding vessels in series for series flow of water through successive vessels, said series coupled vessels comprising a first vessel having a supply water inlet coupling adapted for coupling to a water supply for receiving influent supply water and a last vessel having a treated supply water outlet coupling for delivering treated supply water;

a treated water supply water pump operatively coupled to the last vessel outlet coupling;

each vessel comprising a diffused bubble aeration stage having air diffuser means near the bottom of the vessel for delivering diffused low pressure air bubbles for stripping volatile contaminants from supply water in the vessel, said air diffuser means being spaced from the bottom of the vessel to facilitate mixing and circulation of water in the vessel;

said vessels being formed with air inlet and air outlet coupling means and air inlet and air outlet lines operatively coupled in parallel for parallel flow of diffused air through the vessels, the air inlet coupling means of each vessel being operatively coupled to the respective air diffuser means, the air outlet coupling means being operatively coupled at the top of the vessel to a vent means for venting contaminant-laden air from the top of the vessel after diffusion through supply water in the vessel;

a low pressure high volume air pump operatively coupled to the air inlet coupling means;

said vessels comprising multiple stages for diffused bubble aeration of supply water, passing through the stages, the volume capacity of said vessels being selected for residence time of supply water in the multiple stages adequate for staged aeration stripping and removal of volatile contaminants to a selected limit without substantial mixing between stages during aeration and while meeting current demand for treated supply water;

and electrical control means comprising water pump relay switch means and air pump relay switch means adjusted and arranged for operation of the air diffuser means for stripping contaminants from supply water passing in series through the vessels during selected time periods upon operation of the treated water supply water pump for stripping and removal of volatile contaminants to the selected limit.

2. The diffused bubble aeration system of claim 1 wherein the influent supply water inlet coupling of the first stage vessel is positioned adjacent to the top of the vessel and comprises a float valve adjusted and arranged for closing off the inlet coupling at a specified supply water level, wherein the treated supply water outlet coupling of the last stage vessel is located at the bottom of the vessel below the air diffuser means for delivering treated supply water without air bubble entrainment and wherein the remaining water inlet and water outlet couplings of the series coupled vessels are positioned substantially in the middle portion of the respective vessels, for series flow of supply water through the vessels by the equalizing flow of water equalizing water level in the vessels upon operation of the treated water supply water pump to which the treated supply water outlet coupling of the last stage vessel is coupled.

3. The diffused bubble aeration system of claim 1 further comprising:

an inlet air manifold, said inlet air couplings and air diffuser means of the respective multi-stage vessels being coupled in parallel to the inlet air manifold;

and a vent manifold, said air outlet couplings of the respective multi-stage vessels being coupled in parallel to the vent manifold.

4. The diffused bubble aeration system of claim 3 wherein the air diffuser means comprises a spiral coil at the base of each vessel having a diameter extending substantially the width of the base of the vessel, said spiral coil having small diameter perforations distributed substantially uniformly along the upper surface of the spiral coil for delivering diffuse bubbles for aeration of water in the vessel, and mounting means supporting the spiral coil, and wherein the air inlet coupling of each vessel comprises first and second air inlet lines, said first air inlet line being coupled to the outer end of the spiral coil and said second air inlet line being coupled to the inner end of the spiral coil for simultaneous delivery of air to both ends of the spiral coil diffuser means for diffused bubble aeration, said first and second air inlet lines of each vessel being coupled in parallel to the inlet air manifold at separate exits from the manifold to reduce pressure drop between the air pump means and respective diffuser means.

5. The diffused bubble aeration system of claim 1 wherein the air diffuser means comprises a spiral coil at the base of each vessel having a diameter extending substantially the width of the base of the vessel, said spiral coil having small diameter perforations distributed substantially uniformly along the upper surface of the spiral coil for delivering diffuse bubbles for aeration of water in the vessel, and mounting means supporting the spiral coil.

6. The diffused bubble aeration system of claim 5 wherein the air inlet coupling of each vessel comprises first and second air inlet lines, said first air inlet line being coupled to the outer end of the spiral coil and said second air inlet line being coupled to the inner end of the spiral coil for simultaneous delivery of air to both ends of the spiral coil diffuser means for diffused bubble aeration.

7. The diffused bubble aeration system of claim 5 wherein the spiral coil air diffuser means comprises spaced turns of flexible tubing, wherein the mounting means comprises a frame supporting the spaced turns of flexible tubing and further comprising projecting means projecting inwardly from the sides of the vessel and spaced above the bottom of the vessel whereby the spiral coil and frame float upwardly against the protruding means, said protruding means thereby constraining the diffuser means to a desired location spaced above the bottom of the vessel for circulation of water through the vessel and beneath and through the spaced turns of the spiral coil.

8. The diffused bubble aeration system of claim 1 comprising three to eight water holding vessels comprising three to eight diffused bubble aeration stages.

9. The diffused bubble aeration system of claim 8 comprising six water holding vessels comprising six diffused bubble aeration stages.

10. The diffused bubble aeration system of claim 9 wherein the six vessels comprising the six stages are arranged contiguously in two rows of three barrels and wherein the segments of the series coupling supply water line are coupled alternately between barrels in opposite rows whereby the series flow of supply water through successive vessels progresses from a first stage vessel through intermediate stage vessels in one direction alternating between rows and then returns in the other direction alternating between rows to a last stage vessel positioned adjacent to the first stage vessel.

11. The diffused bubble aeration system of claim 1 comprising restriction flow control means interposed in a supply water line segment between successive vessels.

12. The system of claim 1 further comprising a hydropneumatic treated water storage tank coupled to the treated water supply water pump.

13. The system of claim 1 wherein the electrical control means further comprises means for controlling the rate of aeration during the selected time periods.

14. A diffused bubble aeration system for small scale water supplies comprising:
 a plurality of water holding vessels having water inlet and water outlet couplings and supply water line segments operatively coupling the water holding vessels in series for series flow of water through successive vessels, said series coupled vessels comprising a first vessel having a supply water inlet coupling adapted for coupling to a water supply source for receiving influent supply water and a last vessel having a treated supply water outlet coupling for delivering treated supply water:
 a treated water supply water pump operatively coupled to the last vessel outlet coupling:
 each vessel comprising a diffused bubble aeration stage having air diffuser means near the bottom of the vessel for delivering diffused low pressure air bubbles for stripping volatile contaminants from supply water in the vessel, said air diffuser means being spaced from the bottom of the vessel to facilitate mixing and circulation of water in the vessel:
 said vessels being formed with air inlet and air outlet coupling means and air inlet and air outlet lines operatively coupled in parallel for parallel flow of diffused air through the vessels, the air inlet coupling means of each vessel being operatively coupled to the respective air diffuser means, the air outlet coupling means being operatively coupled at the top of the vessel to a vent means for venting contaminant-laden air from the top of the vessel after diffusion through supply water in the vessel;
 a low pressure high volume air pump operatively coupled to the air inlet coupling means:
 said vessels comprising multiple stages for diffused bubble aeration of supply water, passing through the stages, the volume capacity of said vessels being selected for residence time of supply water in the multiple stages adequate for staged aeration stripping and removal of volatile contaminants to a selected limit without substantial mixing between stages during aeration and while meeting current demand for treated supply water;
 and electrical control means comprising water pump relay switch means and air pump relay switch means adjusted and arranged for operation of the air diffuser means for stripping contaminants from supply water passing in series through the vessels during selected time periods upon operation of the treated water supply water pump for stripping and removal of volatile contaminants to the selected limit:
 said influent supply water inlet coupling of the first stage vessel being positioned adjacent to the top of the vessel and comprising a float valve adjusted and arranged for closing off the inlet coupling at a specified supply water level, said treated supply water outlet coupling of the last stage vessel being located at the bottom of the vessel below the air diffuser means for delivering treated supply water without air bubble entrainment, and said remaining water inlet and water outlet couplings of the series coupled vessels being positioned substantially in the middle portion of the respective vessels below the normal water level in the vessels, for series flow of supply water through the vessels by the equalizing flow of water equalizing the water level in the vessels upon operation of the treated water supply water pump to which the outlet coupling of the last stage vessel is coupled:
 said air diffuser means comprising a spiral coil at the base of each vessel having a diameter extending substantially the width of the base of the vessel, said spiral coil having small diameter perforations distributed substantially uniformly along the upper surface of the spiral coil for delivering diffuse bubbles for aeration of water in the vessel, and mounting means supporting the spiral coil:
 said air inlet coupling of each vessel comprising at least first and second air inlet lines, said first air inlet line being coupled to the outer end of the spiral coil and said second air inlet line being coupled to the inner end of the spiral coil for simultaneous delivery of air to both ends of the spiral coil diffuser means for diffused bubble aeration;
 said diffused bubble aeration system comprising three to eight water holding vessels comprising three to eight diffused bubble aeration stages;
 said spiral coil air diffuser means comprising spaced turns of flexible tubing, said mounting means comprising a frame supporting the spaced turns of flexible tubing and further comprising protruding means protruding inwardly from the sides of the vessel and spaced above the bottom of the vessel whereby the spiral coil and frame float upwardly against the protruding means, said protruding means thereby constraining the diffuser means to a desired location spaced above the bottom of the vessel for circulation of water through the vessel and beneath and through the spaced turns of the spiral coil.

* * * * *

Disclaimer 4,663,089—*Jerry D. Lowry*; *Sylvia B. Lowry*, both of Thorndike, Me. DIFFUSED BUBBLE AERATION SYSTEM. Patent dated May 5, 1987. Disclaimer filed Jan. 7, 1991, by the inventors.

Hereby enters this disclaimer to claims 1-3, 5, and 8-13 of said patent.
[ *Official Gazette September 3, 1991* ]